US012463497B2

(12) United States Patent
Matsumoto et al.

(10) Patent No.: US 12,463,497 B2
(45) Date of Patent: Nov. 4, 2025

(54) ROTATING ELECTRICAL MACHINE

(71) Applicant: MEIDENSHA CORPORATION, Tokyo (JP)

(72) Inventors: Tadahiro Matsumoto, Tokyo (JP); Mototsugu Omura, Tokyo (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/711,525

(22) PCT Filed: Aug. 23, 2022

(86) PCT No.: PCT/JP2022/031735
§ 371 (c)(1),
(2) Date: Jun. 14, 2024

(87) PCT Pub. No.: WO2023/089893
PCT Pub. Date: May 25, 2023

(65) Prior Publication Data
US 2025/0023418 A1    Jan. 16, 2025

(30) Foreign Application Priority Data

Nov. 19, 2021  (JP) ................................ 2021-188334

(51) Int. Cl.
*H02K 5/20* (2006.01)
*H02K 9/04* (2006.01)

(52) U.S. Cl.
CPC ............. *H02K 5/207* (2021.01); *H02K 9/04* (2013.01); *H02K 5/20* (2013.01)

(58) Field of Classification Search
CPC .......... H02K 5/20; H02K 5/203; H02K 5/207; H02K 1/20; H02K 9/00
See application file for complete search history.

(56) References Cited

U.S. PATENT DOCUMENTS

| 4,922,146 A * | 5/1990 | Vanduyn ............ H02K 9/02 310/227 |
| 11,025,136 B2 | 6/2021 | Kawanishi | |
| 2003/0132673 A1* | 7/2003 | Zhou ................. H02K 1/32 310/54 |

FOREIGN PATENT DOCUMENTS

JP    S60-153629 U    10/1985
JP    2007244067 A *   9/2007
(Continued)

OTHER PUBLICATIONS

Kawanishi (JP 2020145899 A) English Translation (Year: 2020).*
Aota (JP 2007244067 A) English Translation (Year: 2007).*

*Primary Examiner* — Tulsidas C Patel
*Assistant Examiner* — Robert E Mates
(74) *Attorney, Agent, or Firm* — Foley & Lardner LLP

(57) ABSTRACT

A housing of a rotating electrical machine accommodates a stator and a rotor, and forms a first space communicating with a gap on a one end-side of the stator and a second space communicating with the gap on another end-side of the stator. The stator has an intermediate duct communicating with the gap. The housing has a one end-side intake port; a one end-side exhaust port; an another end-side intake port; an another end-side exhaust port; and an air intake port. The rotating electrical machine includes a one end-side throttle mechanism to suppress flow of air from the one end-side intake port to the first space more than a flow on the one end-side exhaust port side; and an another end-side throttle mechanism to suppress flow of air from the another end-side intake port to the second space more than a flow on the another end-side exhaust port side.

2 Claims, 5 Drawing Sheets

(56) References Cited

FOREIGN PATENT DOCUMENTS

| JP | 2019-161764 A | | 9/2019 |
|---|---|---|---|
| JP | 2020145899 A | * | 9/2020 |

* cited by examiner

ROTATING ELECTRICAL MACHINE

TECHNICAL FIELD

The present invention relates to a rotating electrical machine.

BACKGROUND ART

For example, in a rotating electrical machine such as a large motor or a large generator, in a case of responding to a demand for higher output or higher speed rotation, there is a problem of a temperature rise accompanying a decrease in heat dissipation in a winding portion of a stator or a magnet portion of a rotor. For example, in the case of increasing the output of the rotating electrical machine, the heat dissipation of the winding portion may be deteriorated by a thick high-voltage insulation paper applied to the winding portion of the stator. In addition, for example, when an outer circumference of the magnet of the rotor is covered with a ring and fixed to the rotor in order to cope with high rotation of the rotating electrical machine, the heat dissipation of the magnet portion may be deteriorated by the ring.

Therefore, there has been proposed a rotating electrical machine that performs cooling by circulating air through a gap between the stator and the rotor or a coil end portion. For example, Patent Literatures 1 and 2 disclose a rotating electrical machine in which an intake port and an exhaust port of cooling air are arranged on one end-side and the another end-side in an axial direction of the rotating electrical machine, respectively, a communication port for taking in outside air is formed in an axially intermediate portion of a housing, and air is circulated through the gap and the coil end portion.

CITATION LIST

Patent Literature

Patent Literature 1: JP 2019-161764 A
Patent Literature 2: JP 2020-145899 A

SUMMARY OF INVENTION

Technical Problem

When the rotor rotates at a high speed in this type of rotating electrical machine, an air pressure in the gap between the stator and the rotor increases, and the air hardly flows. Therefore, in the configuration of Patent Literature 2, an air pressure difference is generated between one end-side and the another end-side in the axial direction of the rotating electrical machine to allow air to flow through the gap. However, in the configuration of Patent Literature 2, since the flow of air is different between one end-side and the another end-side in the axial direction of the rotating electrical machine, cooling unevenness may occur between one end-side and the another end-side in the winding portion and the magnet portion.

The present invention has been made in view of the above circumstances, and provides a rotating electrical machine capable of circulating air in the gap between the stator and the rotor during high-speed rotation and suppressing uneven cooling on one end-side and the another end-side of the rotating electrical machine.

Solution to Problem

One aspect of the present invention is a rotating electrical machine including a stator formed in a cylindrical shape, a rotor disposed concentrically on an inner circumferential side of the stator with a gap, and a housing that accommodates the stator and the rotor. The housing forms a first space communicating with the gap on one end-side of the stator and a second space communicating with the gap on the another end-side of the stator. The stator has an intermediate duct communicating with the gap from an outer circumference of the stator at an intermediate portion in an axial direction. The housing has: a one end-side intake port that cooling air from a blower is taken into the first space; a one end-side exhaust port that exhausts air from the first space; an another end-side intake port that cooling air from a blower is taken into the second space; an another end-side exhaust port that exhausts air from the second space; and an air intake port that communicates with the intermediate duct and takes in air from an outside of the housing. The rotating electrical machine further includes: a one end-side throttle mechanism that suppresses a flow of cooling air from the one end-side intake port to the first space more than a flow on the one end-side exhaust port side; and an another end-side throttle mechanism that suppresses a flow of cooling air from the another end-side intake port to the second space more than a flow on the another end-side exhaust port side.

In the rotating electrical machine according to the aspect, an internal pressure of the first space and an internal pressure of the second space may be adjusted to a negative pressure lower than atmospheric pressure, respectively. Furthermore, the internal pressure of the first space and the internal pressure of the second space may be adjusted to be identical.

In the rotating electrical machine according to the aspect, each of the one end-side throttle mechanism and the another end-side throttle mechanism may include a filter that reduces an air flow rate.

Further, in the rotating electrical machine according to the aspect, each of the one end-side throttle mechanism and the another end-side throttle mechanism may include a movable unit, and an air flow rate may be controllable by changing an opening/closing amount of the movable unit. Furthermore, the one end-side throttle mechanism and the another end-side throttle mechanism may change the air flow rate according to a rotation speed of the rotor.

Advantageous Effects of Invention

In the rotating electrical machine according to one aspect of the present invention, air is circulated through the gap between the stator and the rotor during high-speed rotation, and uneven cooling on one end-side and another end-side of the rotating electrical machine can be suppressed.

DESCRIPTION OF EMBODIMENTS

Figure 1:
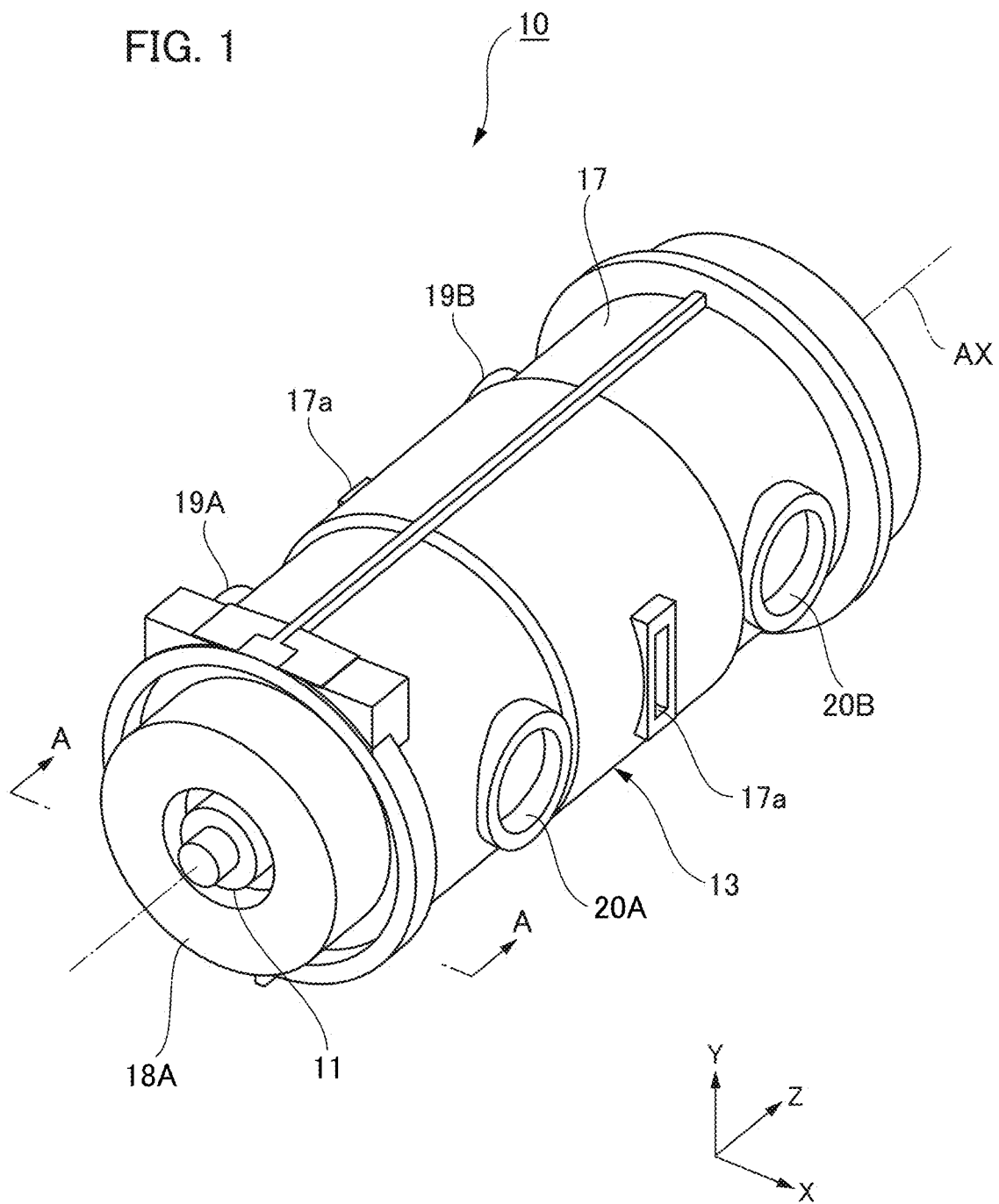
FIG. 1 is an external perspective view illustrating an example of a rotating electrical machine according to the present embodiment.

Hereinafter, embodiments of the present invention will be described with reference to the drawings.

According to the present embodiment, for easy understanding, structures and elements other than the main part of the present invention will be described in a simplified or omitted manner. In the drawings, the same elements are denoted by the same reference numerals. Note that the shapes, dimensions, and the like of the respective elements illustrated in the drawings are schematically illustrated, and do not indicate actual shapes, dimensions, and the like.

In the drawings, an XYZ coordinate system is appropriately illustrated as a three-dimensional orthogonal coordinate system. In the XYZ coordinate system, the Z direction is a direction parallel to a rotation axis AX. The X direction is a direction orthogonal to the Z direction and corresponds to the depth direction of the paper surface of FIG. 2. The Y direction is a direction orthogonal to both the X direction and the Z direction, and corresponds to the vertical direction in FIG. 2. In the drawings, a rotation axis of the rotating electrical machine is indicated by a reference sign AX as necessary. In the following description, a circumferential direction around the rotation axis AX is simply referred to as a circumferential direction, and a radial direction around the rotation axis AX is simply referred to as a radial direction.

Figure 2:
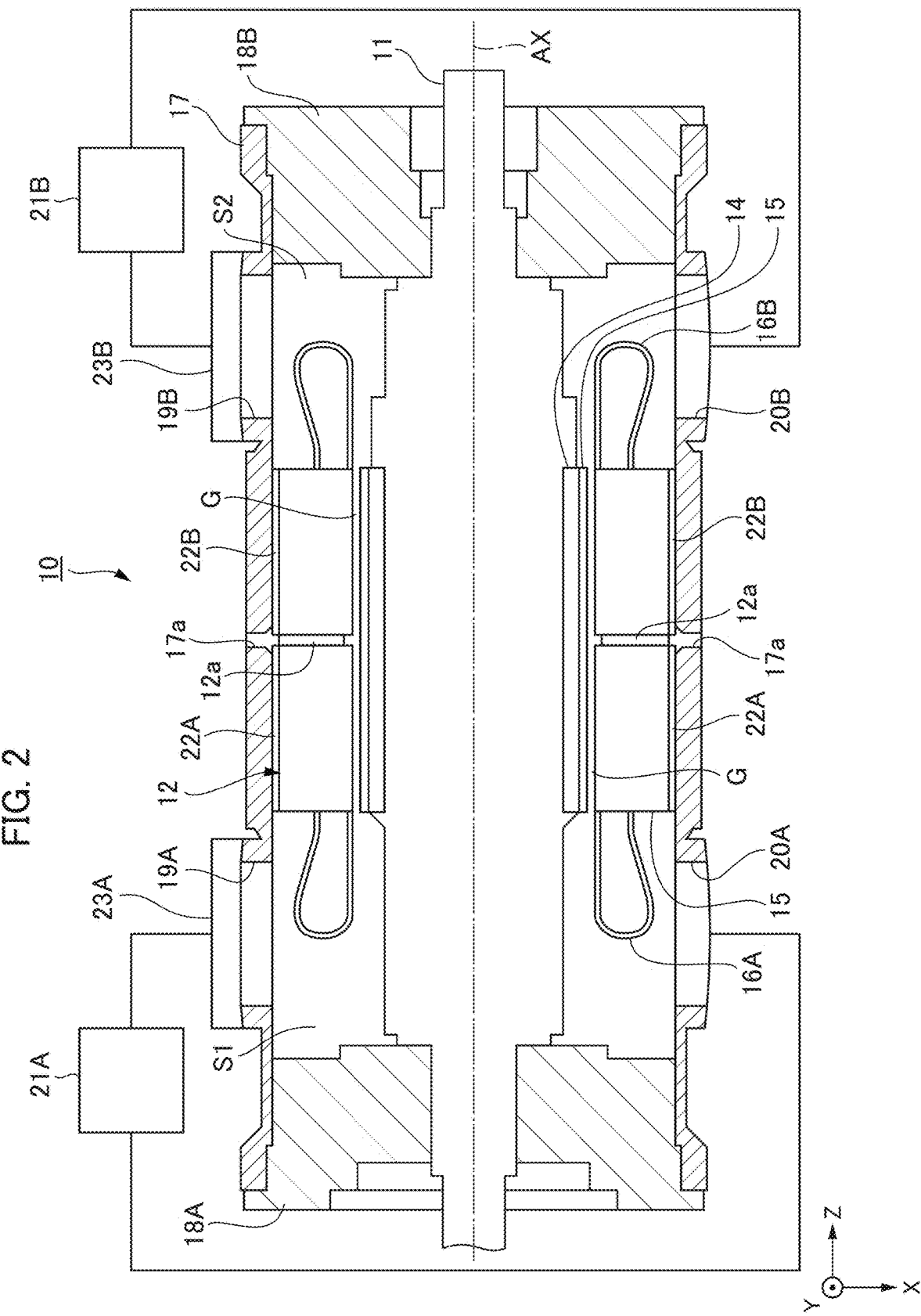
FIG. 2 is a schematic configuration diagram of the rotating electrical machine according to the present embodiment.

FIG. 1 is an external perspective view illustrating an example of a rotating electrical machine 10 according to the present embodiment. FIG. 2 is a schematic configuration diagram of the rotating electrical machine 10 according to the present embodiment. Further, FIG. 2 corresponds to a cross section taken along line A-A in FIG. 1.

The rotating electrical machine 10 according to the present embodiment is an inner rotor type motor, and includes a rotor shaft 11 and a stator 12. The rotor shaft 11 and the stator 12 are accommodated in a cylindrical housing 13.

The rotor shaft 11 is a columnar member disposed along the rotation axis AX of the rotating electrical machine 10, and one end-side (left side in FIG. 2) and the another end-side (right side in FIG. 2) are rotatably supported by bearings (not illustrated) provided in the housing 13. In addition, one end-side of the rotor shaft 11 penetrates the housing 13 and protrudes outside, and is connected to a device (not illustrated) serving as a load of the rotating electrical machine 10.

In a portion of the rotor shaft 11 facing the stator 12, a plurality of permanent magnets 14 constituting magnetic poles of the rotor is disposed. Each permanent magnet 14 is a strip-shaped piece having an arc shape in the circumferential direction. The permanent magnets 14 are annularly arranged in the circumferential direction of the rotor shaft 11 in a state where magnetic poles of magnets adjacent to each other in the circumferential direction alternate with each other and outer circumferential surfaces of the magnets are flush with each other.

A holding ring 15 is fitted to the outer circumferential side of the permanent magnet 14 of the rotor shaft 11 along the axial direction. The holding ring 15 has a function of fastening the permanent magnet 14 from the outer circumferential side to firmly fix the permanent magnet 14 to the rotor shaft 11.

The stator 12 has a cylindrical overall shape and is disposed concentrically on the outer circumference of the rotor shaft 11 with a slight air gap G therebetween. A plurality of slots (not illustrated) are formed along the axial direction on the inner circumference of the stator 12, and a coil is wound around each slot. A coil end portion 16A and a coil end portion 16B of the coil respectively protrude from the stator 12 at both axial ends of the stator 12 and form an annular shape on a plane (XY plane) intersecting the axial direction.

An intermediate duct 12a for circulating air in the radial direction from the outer circumferential side toward the inner circumferential side of the stator 12 is formed at an intermediate portion in the axial direction of the stator 12. The intermediate duct 12a is formed by, for example, sandwiching a spacer at a predetermined position in the axial direction of the stator core to form a space, and a plurality of the intermediate ducts is provided at predetermined intervals in the circumferential direction.

In the rotating electrical machine 10, by sequentially switching a magnetic field of the stator 12 by a current control of the coil, attractive force or repulsive force with the magnetic field of the rotor shaft 11 is generated. As a result, the rotor shaft 11 rotates, and the rotating electrical machine 10 is driven. At this time, the coil of the stator 12 generates heat by energization. In addition, the permanent magnet 14 of the rotor shaft 11 is also heated by electromagnetic induction.

The housing 13 has a housing body 17 having a cylindrical shape as a whole, and a pair of brackets 18A and 18B that respectively close openings on one end-side and the another end-side of the housing body 17. The stator 12 is fitted to the inner circumference of the housing body 17, and the stator 12 and the rotor shaft 11 are concentrically arranged in the cylindrical space of the housing body 17 with the air gap G therebetween.

A first space S1 on one end-side and a second space S2 on the another end-side are formed inside the housing 13, respectively. The first space S1 is surrounded by the housing body 17, the bracket 18A on one end-side, and the stator 12, and accommodates the coil end portion 16A on one end-side of the stator 12. The second space S2 is surrounded by the housing body 17, the bracket 18B on the another end-side, and the stator 12, and accommodates the coil end portion 16B on the another end-side of the stator 12. The first space S1 and the second space S2 communicate with the air gap G, respectively.

As illustrated in FIGS. 1 and 2, the housing body 17 is provided with a pair of air intake ports 19A and 19B and a pair of air exhaust ports 20A and 20B for the coil end portions 16A and 16B on one end-side and the another end-side, respectively.

At a position facing the first space S1 in the housing body 17, a one end-side intake port 19A and a one end-side exhaust port 20A are provided at positions that are rotationally symmetric about the rotation axis AX by 180°, respectively. The one end-side intake port 19A is connected to the discharge side of a first blower 21A that circulates air in the first space S1, and the one end-side exhaust port 20A is connected to the suction side of the first blower 21A. As a result, the air from the first blower 21A is introduced into the first space S1 in a flow intersecting the axial direction from the one end-side intake port 19A, and the air in the first space S1 is sucked into the first blower 21A from the one end-side exhaust port 20A to circulate.

Further, at a position facing the second space S2 in the housing body 17, an another end-side intake port 19B and an another end-side exhaust port 20B are provided at positions that are rotationally symmetric about the rotation axis AX by 180°, respectively. The another end-side intake port 19B is connected to the discharge side of a second blower 21B that circulates air in the second space S2, and the another end-side exhaust port 20B is connected to the suction side of the second blower 21B. As a result, the air from the second blower 21B is introduced into the second space S2 in a flow intersecting the axial direction from the another end-side intake port 19B, and the air in the second space S2 is sucked into the second blower 21B from the another end-side exhaust port 20B to circulate.

Further, in the axial direction of the housing body 17, an air intake port 17a that allows the outside and the inside of the housing body 17 to communicate with each other is formed at an intermediate position between the first space S1 and the second space S2. One air intake port 17a is provided between the one end-side intake port 19A and the another end-side intake port 19B, and one air intake port 17a is provided between the one end-side exhaust port 20A and the another end-side exhaust port 20B. Each air intake port 17a faces the intermediate duct 12a of the stator 12 fitted to the housing body 17, and is connected to the air gap G via the intermediate duct 12a of the stator 12.

A first flow path 22A and a second flow path 22B are formed between the housing body 17 and the stator 12. The first flow path 22A is a flow path that connects the first space S1 and the air intake port 17a and extends along the axial direction. The second flow path 22B is a flow path that connects the second space S2 and the air intake port 17a and extends along the axial direction. A plurality of first flow paths 22A and a plurality of second flow paths 22B are provided at predetermined intervals in the circumferential direction.

As described above, the air intake port 17a formed in the housing body 17 is connected to each of the first flow path 22A, the second flow path 22B, and the intermediate duct 12a of the stator 12. Therefore, air flowing into the housing 13 from the air intake port 17a branches into a flow to the first space S1 via the first flow path 22A, a flow to the second space S2 via the second flow path 22B, and a flow to the air gap G via the intermediate duct 12a. The air flowing into the air gap G from the air intake port 17a via the intermediate duct 12a is branched into a flow to the first space S1 and a flow to the second space S2, respectively.

According to the present embodiment, on the upstream side of the intake ports 19A and 19B of the housing 13, throttle mechanisms 23A and 23B that suppress flows of air from the intake ports 19A and 19B into the housing 13 more than flows on the exhaust ports 20A and 20B side are provided. As an example, the throttle mechanisms 23A and 23B are attached to the one end-side intake port 19A and the another end-side intake port 19B of the housing body 17, respectively. According to the present embodiment, the configurations of the one end-side throttle mechanism 23A and the another end-side throttle mechanism 23B are common.

The one end-side throttle mechanism 23A has a function of adjusting an air flow rate from the one end-side intake port 19A into the housing 13 to adjust an internal pressure of the first space S1 to a desired negative pressure lower than the atmospheric pressure. The another end-side throttle mechanism 23B has a function of adjusting an air flow rate from the another end-side intake port 19B into the housing 13 to adjust an internal pressure of the second space S2 to a desired negative pressure lower than the atmospheric pressure. In addition, the desired negative pressure is set to a pressure at which an air flow is generated from the air gap G toward the first space S1 and the second space S2 when the rotating electrical machine 10 is driven at a predetermined rotational speed or more.

Here, the one end-side throttle mechanism 23A and the another end-side throttle mechanism 23B may be configured such that a filter for reducing the air flow rate is attached in a replaceable manner. When a filter is applied to the throttle mechanisms 23A and 23B, a cooling air on the intake side can be rectified by the filter while reducing the air flow rate from the blowers 21A and 21B to make the inside of the housing 13 have a negative pressure.

As an example, a plurality of punching metals having different opening dimensions (or opening ratios) may be prepared as filters of the throttle mechanisms 23A and 23B, and an arbitrary filter may be attached so that the housing 13 side has a desired air flow rate. Note that the filter is not limited to the punching metal, and may have other configurations.

In addition, the one end-side throttle mechanism 23A and the another end-side throttle mechanism 23B may be configured to be controllable of the air flow rate by changing an opening/closing amount of a movable unit such as a throttle. For example, the throttle mechanisms 23A and 23B may be configured by movable valves such as a butterfly valve and a ball valve.

At this time, the throttle mechanisms 23A and 23B may be controlled to change the air flow rate according to the rotation speed of the rotor shaft 11 of the rotating electrical machine 10. For example, the throttle mechanisms 23A and 23B are controlled such that the throttle is opened and the air flow rate becomes larger when the rotation speed of the rotor shaft 11 is the first rotation speed less than a threshold value than when the rotation speed is the second rotation speed equal to or greater than the threshold value.

For example, during high torque requiring acceleration in the low-speed to medium-speed rotation range of the rotating electrical machine 10, a current of the coil increases, and a heat generation in the coil also increases. In a case where the movable valve is applied as the throttle mechanisms 23A and 23B, the air flow rates through the throttle mechanisms 23A and 23B can be more increased during high torque than during high rotation of the rotating electrical machine 10, then the cooling air flowing from the blowers 21A and 21B to the coil end portions 16A and 16B can be increased.

Here, the internal pressures of the first space S1 and the second space S2 are preferably adjusted identically by the throttle mechanisms 23A and 23B. When the internal pressures of the first space S1 and the second space S2 are identical, the flows of air branched from the air intake port 17a are symmetrical both at the first space S1 side and at the second space S2 side, and it is possible to further suppress unevenness in cooling of the rotating electrical machine 10 in the axial direction.

If the difference between the air flow rate from the air intake port 17a to the first space S1 and the air flow rate from the air intake port 17a to the second space S2 falls within an allowable range, there may be a difference between the internal pressures of the first space S1 and the second space S2 (in other words, the throttle amounts of the throttle mechanisms 23A and 23B).

Figure 3:
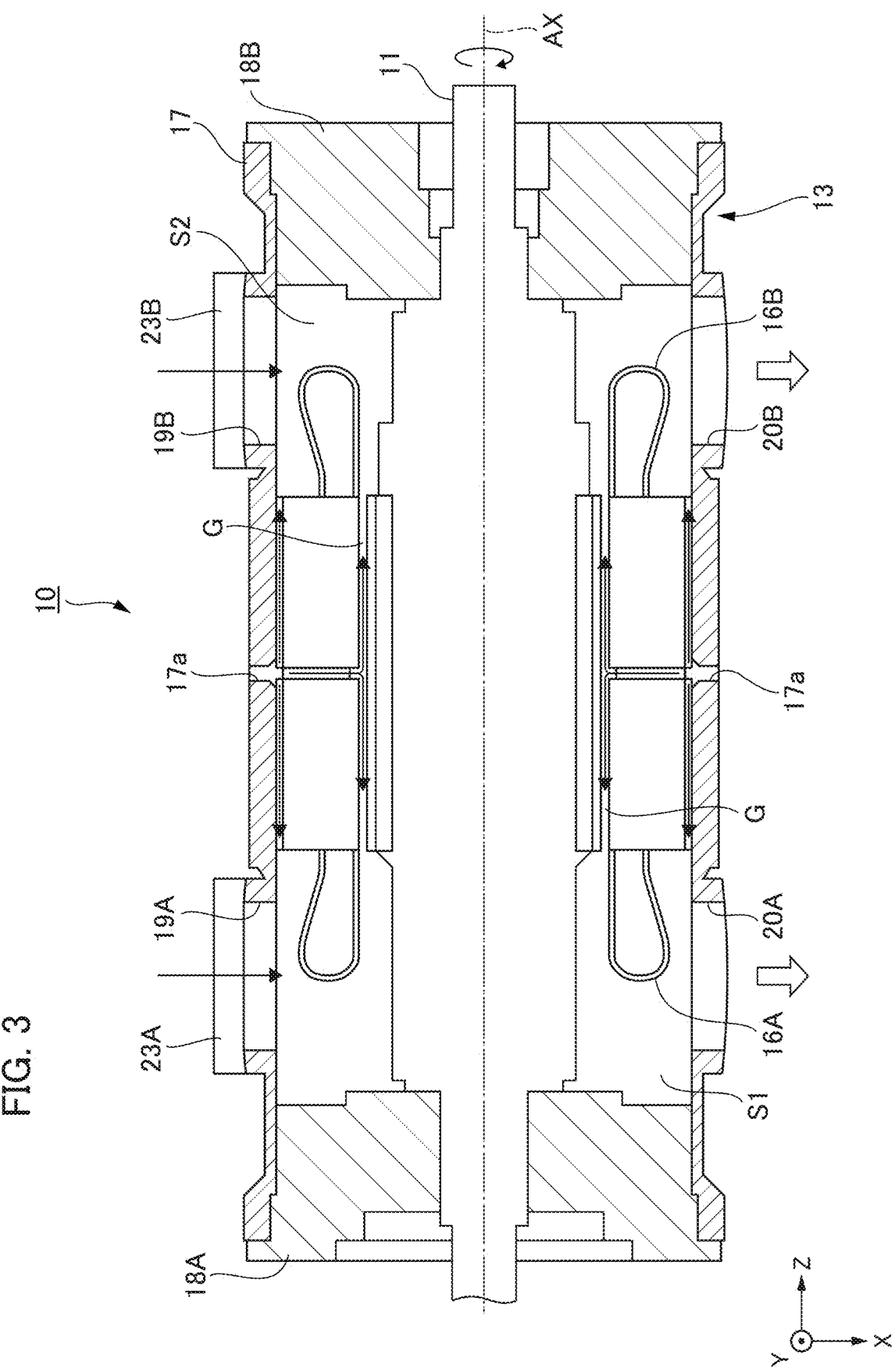
FIG. 3 is a diagram illustrating a flow of air during high rotation in the rotating electrical machine according to the present embodiment.
Figure 4:
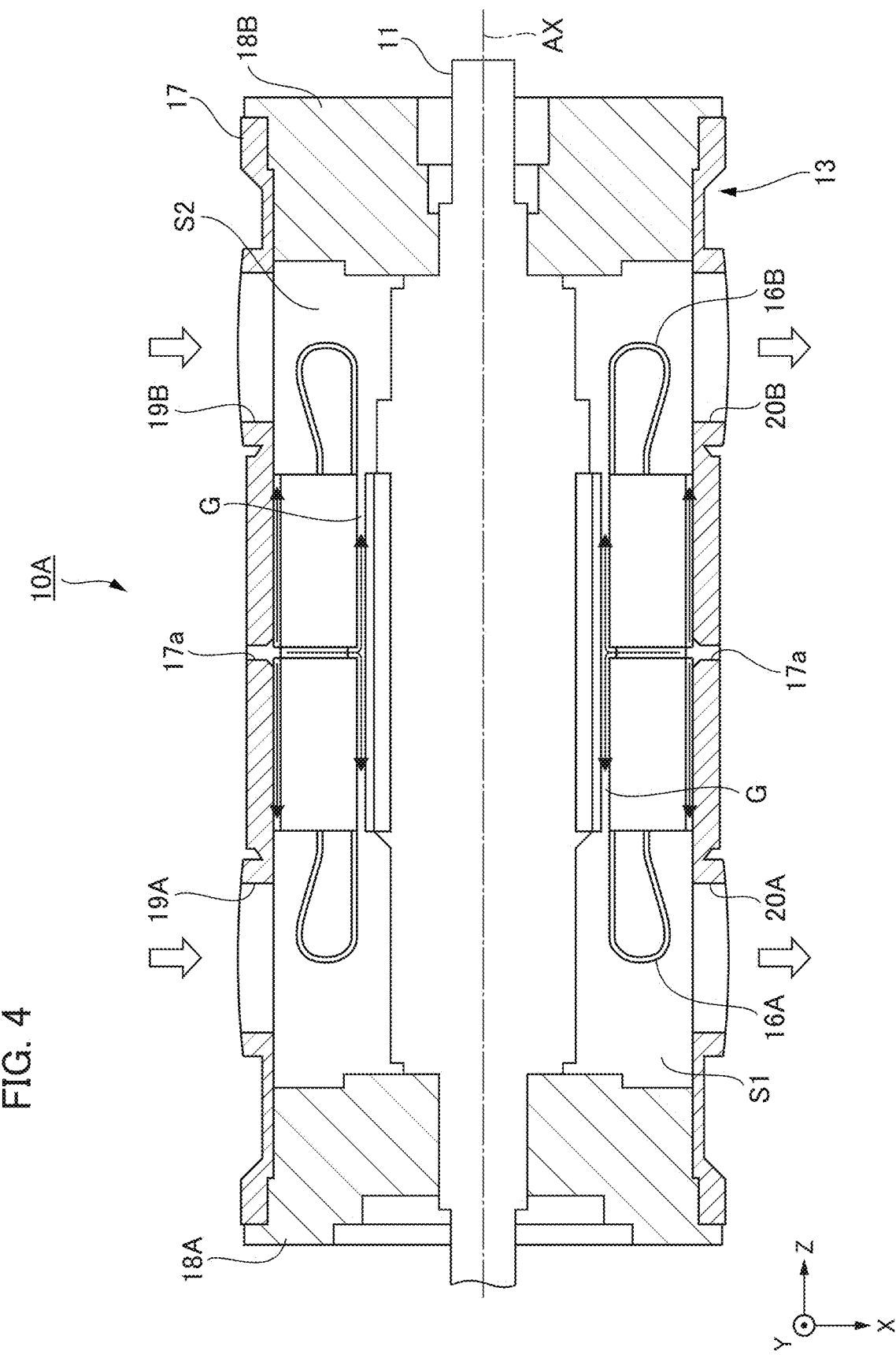
FIG. 4 is a diagram illustrating a flow of air during no rotation in a rotating electrical machine of a comparative example.
Figure 5:
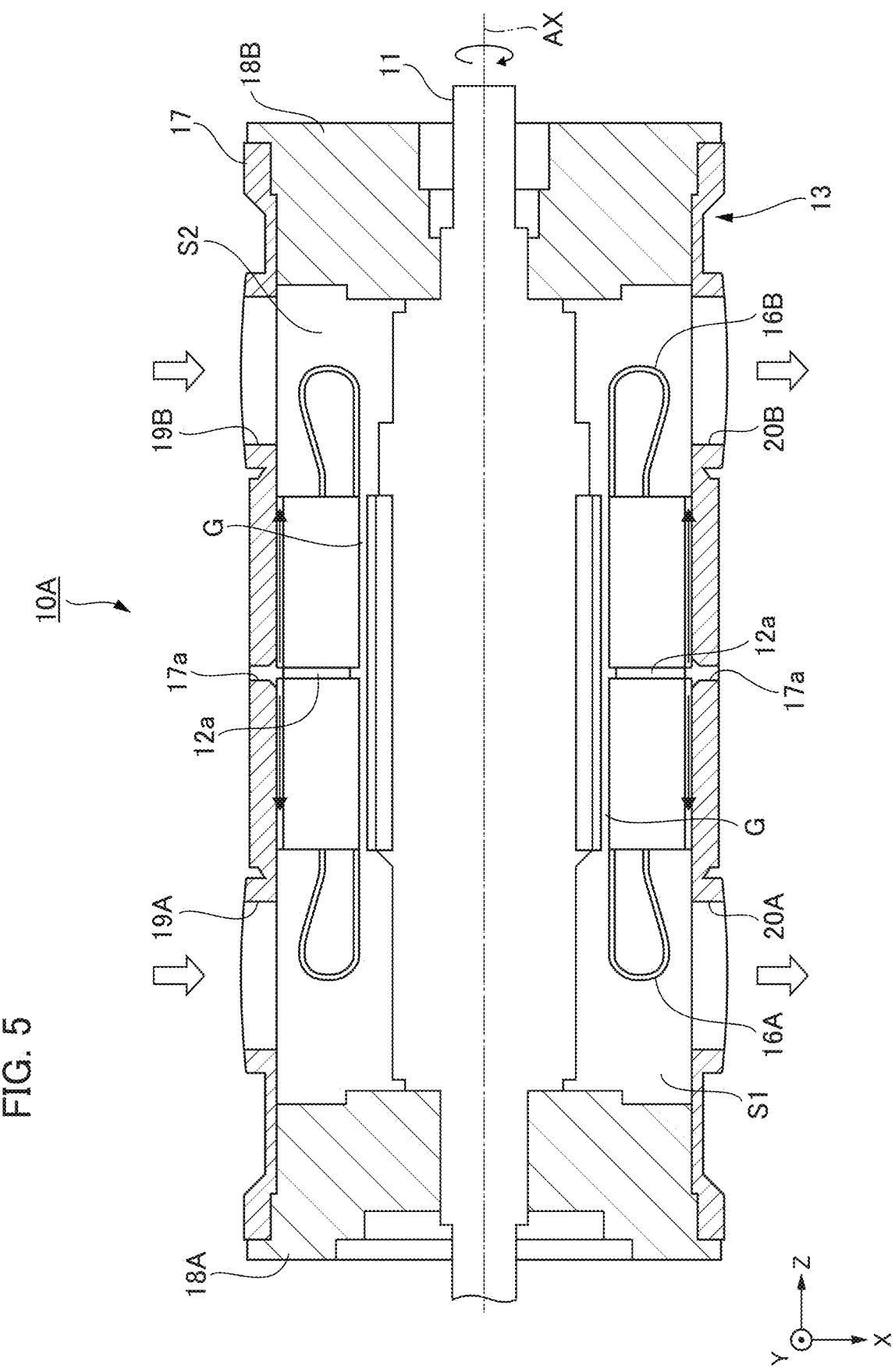
FIG. 5 is a diagram illustrating a flow of air during high rotation in the rotating electrical machine of the comparative example.

Hereinafter, effects according to the present embodiment will be described in comparison with a comparative example. FIG. 3 is a diagram illustrating a flow of air during high rotation in the rotating electrical machine 10 according to the present embodiment. FIG. 4 is a diagram illustrating a flow of air during no rotation in a rotating electrical machine 10A of the comparative example. FIG. 5 is a diagram illustrating a flow of air during high rotation in the rotating electrical machine 10A of the comparative example. In FIGS. 3 to 5, the blowers 21A and 21B and a pipe system thereof are appropriately omitted.

First, the flows of air in the rotating electrical machine 10A of the comparative examples of FIGS. 4 and 5 will be described. The configuration of the rotating electrical machine 10A of the comparative examples is similar to the configuration of the rotating electrical machine 10 according to the present embodiment except that the throttle mechanisms 23A and 23B are not provided.

When the blowers 21A and 21B are operated in the rotating electrical machine 10A of the comparative example, air is sucked out from the exhaust ports 20A and 20B in the first space S1 and the second space S2, respectively, and the respective internal pressures become a negative pressure lower than the atmospheric pressure. Then, the air flows into the housing 13 from the air intake port 17a due to the air pressure difference from the atmospheric pressure.

In the rotating electrical machine 10A of the comparative example, the flows of air from the air intake port 17a during no rotation are indicated by arrows in FIG. 4. The flows of air from the air intake port 17a branch into a flow to the first space S1 via the first flow path 22A, a flow to the second space S2 via the second flow path 22B, and a flow to the air gap G via the intermediate duct 12a. The air flowing into the air gap G from the air intake port 17a via the intermediate duct 12a is branched into the flow to the first space S1 and the flow to the second space S2, respectively.

As a result, the outer circumference of the stator 12 is cooled by the air passing through the first flow path 22A or the second flow path 22B. The inner circumference of the stator 12 and the rotor shaft 11 are cooled by the air passing through the air gap G. The coil end portions 16A and 16B are cooled by the air passing through the intake ports 19A and 19B and the air from the air intake port 17a.

The flows of air from the air intake port 17a during high-speed rotation in the rotating electrical machine 10A of the comparative example are indicated by arrows in FIG. 5. During high-speed rotation of the rotating electrical machine 10A, the air pressure of the air gap G becomes uniformly higher due to the rotation of the rotor shaft 11 than during no rotation. Then, since the air hardly flows into the air gap G from the air intake port 17a, the cooling effect at the magnet portion of the rotor shaft 11 decreases during high-speed rotation.

On the other hand, in the rotating electrical machine 10 according to the present embodiment, the flows of air from the air intake port 17a during high-speed rotation are indicated by arrows in FIG. 3.

In the rotating electrical machine 10 according to the present embodiment, the throttle mechanisms 23A and 23B are provided on the upstream side of the intake ports 19A and 19B of the housing 13. Therefore, according to the present embodiment, since the air flow rate from the intake ports 19A and 19B into the housing 13 is smaller than the air flow rate in the comparative example without the throttle mechanisms 23A and 23B, the internal pressures of the first space S1 and the second space S2 are lower than the internal pressures in the comparative example, and the air pressure difference from the atmospheric pressure also increases. As a result, according to the present embodiment, the flow of air from the air intake port 17a to the first space S1 and the second space S2 is larger than the flow of air in the comparative example.

Also according to the present embodiment, the air pressure of the air gap G is higher during high-speed rotation of the rotating electrical machine 10 than during no rotation, but as described above, the internal pressures of the first space S1 and the second space S2 are lower by the throttle mechanisms 23A and 23B than in the comparative example. Therefore, according to the present embodiment, the flow of air from the air intake port 17a to the air gap G is secured even during high-speed rotation, and the magnet portions of the rotor shaft 11 can be air-cooled. As a result, the cooling performance of the rotating electrical machine 10 is further improved, and higher output and higher speed rotation can be further achieved.

According to the present embodiment, as compared with a configuration in which a pressure difference is generated between the first space and the second space to cause cooling air to flow through the air gap G, the flows of cooling air are substantially symmetrical both at the one end-side and at the another end-side of the rotating electrical machine 10. Therefore, according to the present embodiment, it is possible to suppress cooling unevenness of the coil end portions 16A and 16B and the magnet portions on one end-side and the another end-side of the rotating electrical machine 10.

In addition, in the configuration according to the present embodiment, since the specifications regarding air cooling on one end-side and the another end-side of the rotating electrical machine 10 can be identical, the configuration, adjustment, and the like regarding air cooling of the rotating electrical machine 10 can be simplified.

The present invention is not limited to the above embodiment, and various improvements and design changes may be made without departing from the gist of the present invention.

In the above embodiment, the configuration example of the motor has been described as an example of the rotating electrical machine 10, but the rotating electrical machine of the present invention can also be applied to a generator.

According to the present embodiment, the example that the throttle mechanisms 23A and 23B are attached to the intake ports 19A and 19B of the housing body 17 has been described, but the throttle mechanisms 23A and 23B may not be directly attached to the housing 13. For example, the throttle mechanisms 23A and 23B may be provided on pipes connecting the intake ports 19A and 19B and the blowers 21A and 21B.

According to the present embodiment, the example that the blower is disposed on each of the one end-side and the another end-side has been described, but one blower may be shared on each of the one end-side and the another end-side.

In addition, when a movable valve capable of controlling the opening/closing amount of a throttle is applied as the throttle mechanisms 23A and 23B, the opening/closing amount of the throttle may be changed by three or more stages according to the rotation amount of the rotating electrical machine.

In addition, the embodiments disclosed herein are to be considered in all respects as illustrative and not restrictive. The scope of the present invention is indicated not by the above description but by the claims, and it is intended that meanings equivalent to the claims and all modifications within the scope are included.

REFERENCE SIGNS LIST 10, 10A rotating electrical machine
11 rotor shaft
12 stator
12a intermediate duct
13 housing
14 permanent magnet
15 holding ring
16A, 16B coil end portion
17 housing body 17a air intake port
18A, 18B bracket
19A, 19B intake port
20A, 20B exhaust port
21A, 21B blower
22A, 22B flow path
23A, 23B throttle mechanism

The invention claimed is:

1. A rotating electrical machine comprising:
a stator formed in a cylindrical shape;
a rotor disposed concentrically on an inner circumferential side of the stator with a gap; and
a housing that accommodates the stator and the rotor and forms a first space communicating with the gap on a one end-side of the stator and a second space communicating with the gap on another end-side of the stator,
wherein the stator has an intermediate duct communicating with the gap from an outer circumference of the stator at an intermediate portion in an axial direction, and the housing has:
a one end-side intake port that cooling air from a blower is taken into the first space;
a one end-side exhaust port that exhausts air from the first space;
an another end-side intake port that cooling air from a blower is taken into the second space;
an another end-side exhaust port that exhausts air from the second space; and
an air intake port that communicates with the intermediate duct and takes in air from an outside of the housing, and
the rotating electrical machine further comprises:
a one end-side throttle mechanism configured to suppress a flow of cooling air from the one end-side intake port to the first space more than a flow on the one end-side exhaust port and adjust an internal pressure of the first space to a negative pressure lower than atmospheric pressure; and
an another end-side throttle mechanism configured to suppress a flow of cooling air from the another end-side intake port to the second space more than a flow on the another end-side exhaust port and adjust an internal pressure of the second space to a negative pressure lower than atmospheric pressure and to the same internal pressure as the internal pressure of the first space, each of the one end-side throttle mechanism and the another end-side throttle mechanism including a filter that reduces an air flow rate, and adjusts the air flow rate by selectively attaching the filter from among a plurality of filters having different opening shapes.

2. The rotating electrical machine of claim 1, wherein the filter of the one end-side throttle mechanism has different opening dimensions than the filter of the another end-side throttle mechanism.

* * * * *